United States Patent
Kim

(10) Patent No.: US 7,224,725 B2
(45) Date of Patent: May 29, 2007

(54) METHOD FOR DETERMINING COEFFICIENTS OF AN EQUALIZER AND APPARATUS FOR DETERMINING THE SAME

(75) Inventor: Yong-Woon Kim, Suwon-shi (KR)

(73) Assignee: Samsung Electronics, Co., Suwon (KR)

( * ) Notice: Subject to any disclaimer, the term of this patent is extended or adjusted under 35 U.S.C. 154(b) by 731 days.

(21) Appl. No.: 10/379,851

(22) Filed: Mar. 5, 2003

(65) Prior Publication Data

US 2003/0169809 A1  Sep. 11, 2003

(30) Foreign Application Priority Data

Mar. 6, 2002  (KR)  ............................... 2002-11889

(51) Int. Cl.
*H03H 7/30* (2006.01)
(52) U.S. Cl. ..................................................... 375/232
(58) Field of Classification Search ................ 375/229, 375/230, 232
See application file for complete search history.

(56) References Cited

U.S. PATENT DOCUMENTS

| 6,535,552 B1* | 3/2003 | Pessoa ........................ 375/231 |
| 6,819,716 B1* | 11/2004 | Purkovic et al. ........ 375/240.26 |
| 2002/0141494 A1* | 10/2002 | Chappell .................... 375/228 |

* cited by examiner

*Primary Examiner*—Kevin Kim
(74) *Attorney, Agent, or Firm*—F. Chau & Associates, LLC

(57) ABSTRACT

A method for estimating a phase response for an upstream area in a channel is based on an extrapolation and, following forcible distortion of an amplitude response, coefficients of a time domain equalizer and coefficients of a channel target circuit are determined using a minimum MSE algorithm. When the cost function of a minimum MES is determined, the square of the coefficients of the time domain equalizer are included for determining the cost function in order to reduce the probability that the coefficients of the time domain equalizer diverge. A channel-shortening effect of the time domain equalizer is improved to reduce inter-symbol interference (ISI) and inter-channel interference (ICI). As a result, a signal to noise ratio (SNR) of a communication system is improved.

13 Claims, 11 Drawing Sheets

METHOD FOR DETERMINING COEFFICIENTS OF AN EQUALIZER AND APPARATUS FOR DETERMINING THE SAME

BACKGROUND OF THE INVENTION

1. Field of the Invention

The present invention relates to a method for determining coefficients of an equalizer and a device for determining the same.

2. Discussion of the Related Art

Asymmetric high speed digital subscriber line (ADSL) and very high speed digital subscriber line (VDSL) are examples of modern communication systems that permit transmission of data over communication lines at very high rates (e.g., up to 52 Mbits/s). The transmission of high-speed data over band-limited channels may be accomplished by means of discrete multitone (DMT)-based digital communication systems. DMT modems are multi-carrier transmission systems for dividing transmission data into several interleaved bit streams and using these bit streams to modulate several carriers.

Significant limitations in high data rate communication systems are inter-symbol interference (ISI) and inter-channel interference (ICI). One way to compensate for ISI in a DMT system is to add a cyclic prefix to the beginning of each transmitted DMT symbol. Unfortunately, while increasing the length of prefixes reduces ISI, it also decreases the effective data rate. Another approach to combat ISI is to employ an equalizer at the receiver. However, many equalizers need considerable and ongoing computational "overhead".

In practical communications, the frequency response of a communications channel is not known. Accordingly, equalizers are designed using numerous parameters that need to be adjusted on the basis of measurements of characteristics having an influence on signals of the channel.

A typical equalizer comprises a transversal filter having a delay line spaced by T-seconds, where "T" is the sampling interval and "fs=1/T" is the sampling rate at the receiver. The outputs of filter taps are multiplied by a filter coefficient, summed, and input to a coefficient decision device for selecting coefficients. The coefficient values are typically selected to minimize either peak distortion or mean-squared distortion. The tap coefficients correspond to the channel parameters. Depending on which coefficients are selected, the equalizer can substantially remove the interference from DMT symbols.

There are at least two general approaches to obtain coefficients of an equalizer. One approach is a minimum mean-squared error (MSE) technology to minimize an MSE. Another approach is to obtain an eigenvalue and an eigenvector using the singular value decomposition (SVD). While the SVD approach obtains improved results as compared to the MSE approach, the SVD approach is not widely used in practical communication modems. The SVD approach can be classified into a direct matrix inversion approach or an adaptive algorithm approach. While the adaptive algorithm approach is substantially more efficient than the direct matrix inversion approach, it is not suitable for real-time communications because it is difficult to determine a degree of coefficient convergence. The direct matrix inversion approach is also computationally expensive for the matrix inversion. But since a matrix for inversion is a covariance matrix of a given communication channel, the computational expense is reduced to readily realize the direct matrix inversion approach.

Unfortunately, these approaches are limited in terms of reducing the inter-symbol interference (ISI) and the inter-channel interference (ICI). This is because a receiver installed at the DMT modem knows the frequency response characteristic of a downstream area in a channel for receiving data from a central office, but does not know the frequency response characteristic of an upstream area in a channel for sending data from the receiver to a central office or node along a communications line.

Therefore, a need exists for an equalizer, which amplifies and attenuates a received signal so that the whole band of a channel has a uniform gain, amplifies an upstream area without response and attenuates a downstream area with response. As a result, a channel of a practically used frequency area is attenuated to reduce a signal to noise ratio (SNR).

SUMMARY OF THE INVENTION

To overcome the foregoing disadvantages, a method according to an embodiment of the present invention determines coefficients of an equalizer by estimating a frequency response of an upstream area in a channel.

Further, an apparatus according to an embodiment of the present invention determines coefficients of an equalizer to minimize an inter-symbol interference (ISI) and an inter-channel interference (ICI).

According to an embodiment of the present invention, a method determines coefficients of a time domain equalizer in a receiver for receiving a reception signal transmitted through a downstream area in a communication channel having an upstream area and the downstream area. The method comprises estimating a frequency response of the upstream area in the communication channel, and determining the coefficients of the time domain equalizer from the estimated frequency response of the upstream area and a frequency response of the downstream area.

In this embodiment, the method further comprises determining a cost function using the estimated frequency response of the upstream area and the frequency response of the downstream area, and determining the coefficients using the determined cost function.

In this embodiment, the cost function is the sum of the square of a difference between a channel impulse response of the communication channel and an equalized channel impulse response and the square of the coefficient of the time domain equalizer.

In this embodiment, the channel impulse response and the equalized channel impulse response are determined according to an initial training signal comprising a unit pulse transmitted to the receiver through the communication channel.

In this embodiment, the frequency response of the upstream area comprises a phase response and an amplitude response of the upstream area.

In this embodiment, the phase response of the upstream area is estimated based on gradients of subchannels in the downstream area.

In this embodiment, the amplitude response of the upstream area is estimated wherein amplitudes of adjacent subchannels in the upstream area have different values.

In this embodiment, the amplitude response of the upstream area is estimated wherein even-number subchannels in the upstream area have a predetermined value h1 and odd-number subchannels have a value h2 that is smaller than the predetermined value h1.

According to another embodiment of the present invention, the invention provides an apparatus determines coefficients of a time domain equalizer in a receiver for receiving a reception signal transmitted through a downstream area in a communication channel having an upstream area and the downstream area. The apparatus comprises an estimator for estimating a frequency response of the upstream area, and a calculator for determining the coefficients of the time domain equalizer from the estimated frequency response of the upstream area and a frequency of the downstream area.

In this embodiment, the estimator has a phase estimator for estimating a phase response of the upstream area and an amplitude estimator for estimating an amplitude response of the upstream area.

In this embodiment, the phase estimator estimates the phase response of the upstream area based on gradients of any subchannels in the downstream area.

In this embodiment, the amplitude estimator estimates amplitudes of adjacent subchannels in the upstream area.

In this embodiment, the calculator determines a cost function using the estimated frequency response of the upstream area and the frequency response of the downstream area, and determines the coefficients using the determined cost function.

In this embodiment, the cost function is the sum of the square of a difference between a channel impulse response of the communication channel and an equalized channel impulse response and the square of the coefficient of the time domain equalizer.

In this embodiment, the channel impulse response and the equalized channel impulse response are determined according to an initial training signal comprising a unit pulse transmitted to the receiver through the communication channel.

According to another embodiment of the present invention, a method sets coefficients of a time domain equalizer in a communication system for transmitting a signal through a communication channel having an upstream area and a downstream area so that an error between an output of the time domain equalizer and an output of a channel target circuit becomes zero. The method comprises estimating a frequency response of the upstream area in the communication channel, estimating an output of the time domain equalizer from the estimated frequency response of the upstream area and the frequency response of the downstream area, determining a cost function J from the estimated output of the time domain equalizer and the output of the channel target circuit, and determining coefficients where the cost function J has a minimum value. The cost function J is given by the following equation:

$$J=E\{e^2\}+\lambda|a|^2$$

where E is an error function, e is an error between an output of a time domain equalizer and an output of a channel target circuit, $\lambda$ is an integer except 1, and a is coefficients of the time domain equalizer.

In this embodiment, the coefficients of the time domain equalizer are determined from the cost function J by means of a minimum mean square error (MSE) algorithm.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
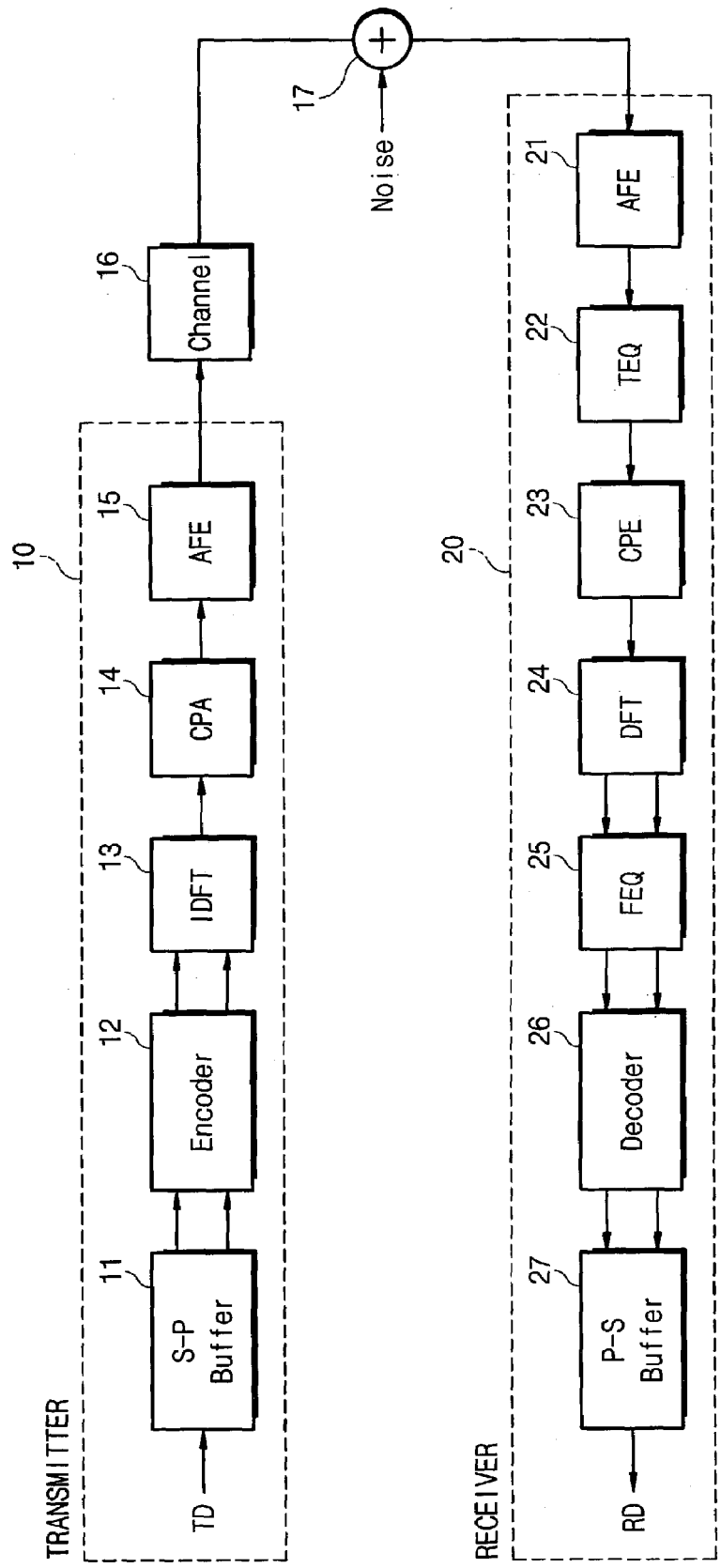
FIG. 1 is a structural view of a transmitter and a receiver, which are provided in a multi-carrier transmission system.

A transmitter 10 and a receiver 20 of a conventional multi-carrier transmission system are illustrated in FIG. 1. The transmitter 10 comprises a serial-to-parallel converting buffer (S-P buffer) 11, an encoder 12, an inverted discrete Fourier transformer (IDFT) 13, a cyclic prefix adding unit (CPA) 14, and an analog front end unit (AFE) 15 having a low pass filter and performing an digital-to-analog conversion.

The receiver 20 comprises an analog front end (AFE) unit 21 having a low pass filter and performing an analog-to-digital conversion, a time domain equalizer (TEQ) 22, a cyclic prefix eliminating unit (CPE) 23, a discrete Fourier transformer (DFT) 24, a frequency domain equalizer (FEQ) 25, and a parallel-to-serial converting buffer (P-S buffer) 27.

As shown in FIG. 1, a channel 16 (i.e., a transmission path, for example, a telephone network) is provided between the transmitter 10 and the receiver 20. A noise source 17 is disposed on the channel 16.

Bit streams of transmission data (TD) are input to the S-P buffer 11 that converts serial bit streams into parallel bit streams. The S-P buffer 11 outputs parallel bit streams to the encoder 12.

The encoder 12 divides parallel bit streams into a plurality of parallel bit string groups (N pieces), encodes each of the parallel bit string groups as coded information, and outputs the coded information to the IDFT 13. In this case, coded N pieces (hereinafter referred to as "N-coded information") are assigned to N carriers. Each carrier is transmitted as a "transmission symbol".

The IDFT 13 performs the inverted discrete Fourier transform on the N-coded information and converts the N-coded information from a frequency base signal to a time base signal. In an actual determination of the inverted discrete Fourier-transform (IDFT), an inverted fast Fourier transform (IFFT) is used instead of the IDFT to improve the speed of the determination.

The time base signals converted by the IDFT 12 are transmitted to the CPA 14. When a cyclic prefix adding process is performed, an inter-symbol interference (ISI) caused by a response characteristic of the channel 16 having a predetermined transmission delay can be substantially eliminated using the CPE and the TEQ 22.

Signals, which are subjected to the cyclic prefix adding process, are transmitted to the AFE 15 that converts digital signals into analog signals. The analog signals are transmitted to the channel 16 through the low pass filter provided in the AFE 15.

In a channel used for the data transmission, if an amplitude characteristic (i.e., gain) and a group delay characteristic of the channel are constant, there will be no channel distortion of the signals. However, because the frequency characteristic is not constant in the actual channel, the signals are influenced by the channel distortion.

The distorted signals are transmitted to the AFE 21 through the channel 16. In the AFE 21, noise components at a high frequency are substantially eliminated by the low pass filter and the signals are converted into digital signals. The digital signals are then output to the TEQ 22.

If the channel distortion is large, the influence applied to the signals also becomes large. Accordingly, the large distortion results in inter-channel interference (ICI) and inter-symbol interference (ISI). As a result, the large distortion has an influence on the received signals.

The distorted signals are transmitted to the AFE 21 through the channel 16. In the AFE 21, noise components at high frequency are substantially eliminated by the low pass filter and the signals are converted into the digital signals. The digital signals are then output to the TEQ 22.

Figure 2:
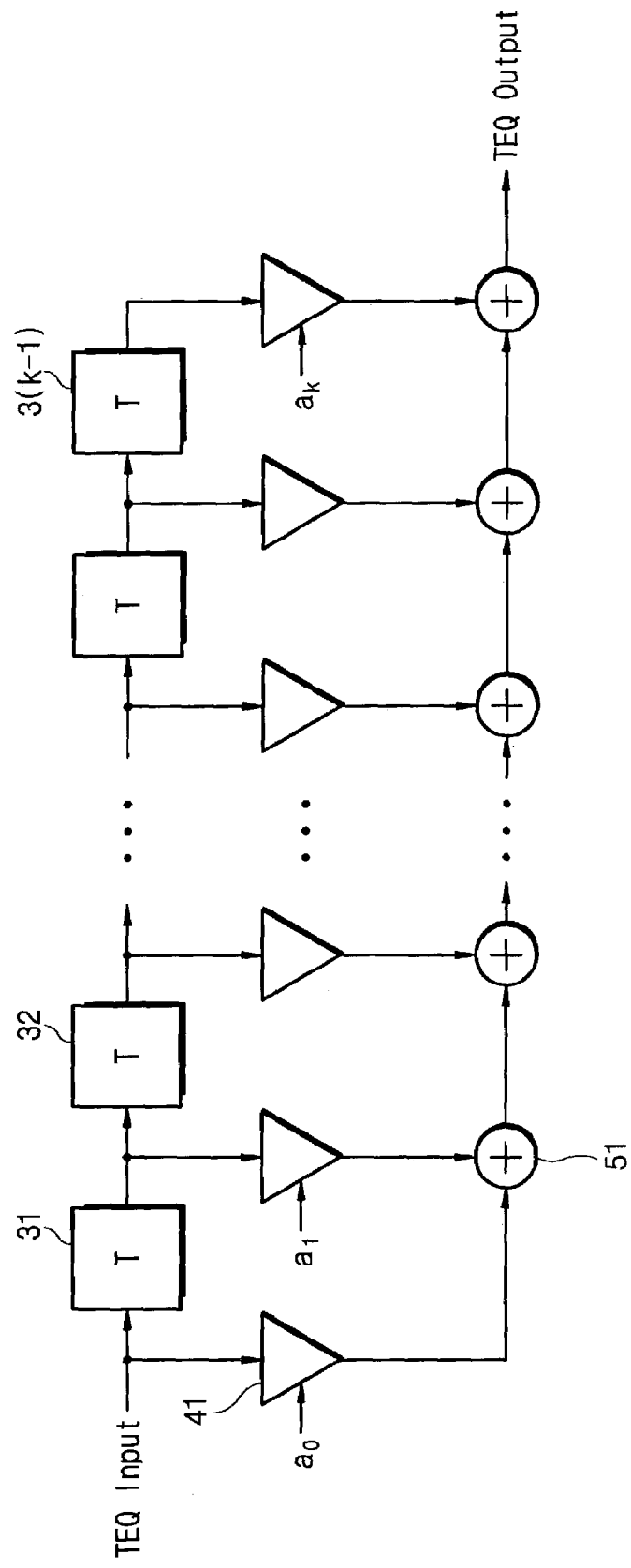
FIG. 2 is a structural view of a transversal filter, which is provided in a time domain equalizer (TEQ)

A structure of a transversal filter used in a time domain equalizer (TEQ) is illustrated in FIG. 2. This transversal filter has tap length K. As shown in FIG. 2, (K−1) delay elements are connected in series. Each of the (K−1) delay elements has a delay time for each sampling period. An input signal (TEQ input) from the AFT 21 is input to a first delay element 31. The input signal, delayed by the first delay element 31, is input to a second delay element 32. The signal continues through the TEQ 22 until the final delay element 3(K−1).

As illustrated in the figure, each of the K multipliers 41 is coupled to an output of a delay element T except the first multiplier, and (K−1) adders 51 are coupled to each output of the multipliers 41. Each of the multipliers 41 multiplies an output of a delay element T by a corresponding coefficient, e.g., a0, a1, . . . , and ak. Outputs from the multipliers 41 are sequentially added by the (K−1) adders 51, so that an output signal (TEQ output) from the last delay adder becomes an output of the TEQ 22.

Returning to FIG. 1, the TEQ 22 reduces the length of the taps of a channel characteristic (i.e., impulse response characteristic) from an infinite length to a predetermined length L or less. According to this function, the influence of the inter-symbol interference (ISI) at a reception signal may be suppressed within a range of the cyclic prefix having the length L.

The DFT 24 converts an information symbol, having a length L, from a time base signal to symbol data. To enhance an operation speed, a fast Fourier transformer (FFT) may be used instead of the DFT.

The frequency domain equalizer (FEQ) 24 equalizes symbol data for each carrier on the frequency base. The decoder 26 decodes each symbol data to the data of parallel bit strings. The P-S buffer 27 converts data of parallel bit strings into data of serial bit strings and outputs the data of serial bits strings as reception data of the receiver 20.

A training unit, which is provided in the TEQ 22 and reduces the number of taps of a channel characteristic into a predetermined length L, has been disclosed in U.S. Pat. No. 5,285,474 entitled "METHOD FOR EQUALIZING A MULTICARRIER SIGNAL IN A MULTICARRIER COMMUNICATION SYSTEM" issued to Jack Chow and John M. Chioffi.

A method for determining (training) coefficients of the TEQ 22 shown in FIG. 1 is explained with reference to FIG. 3.

Figure 3:
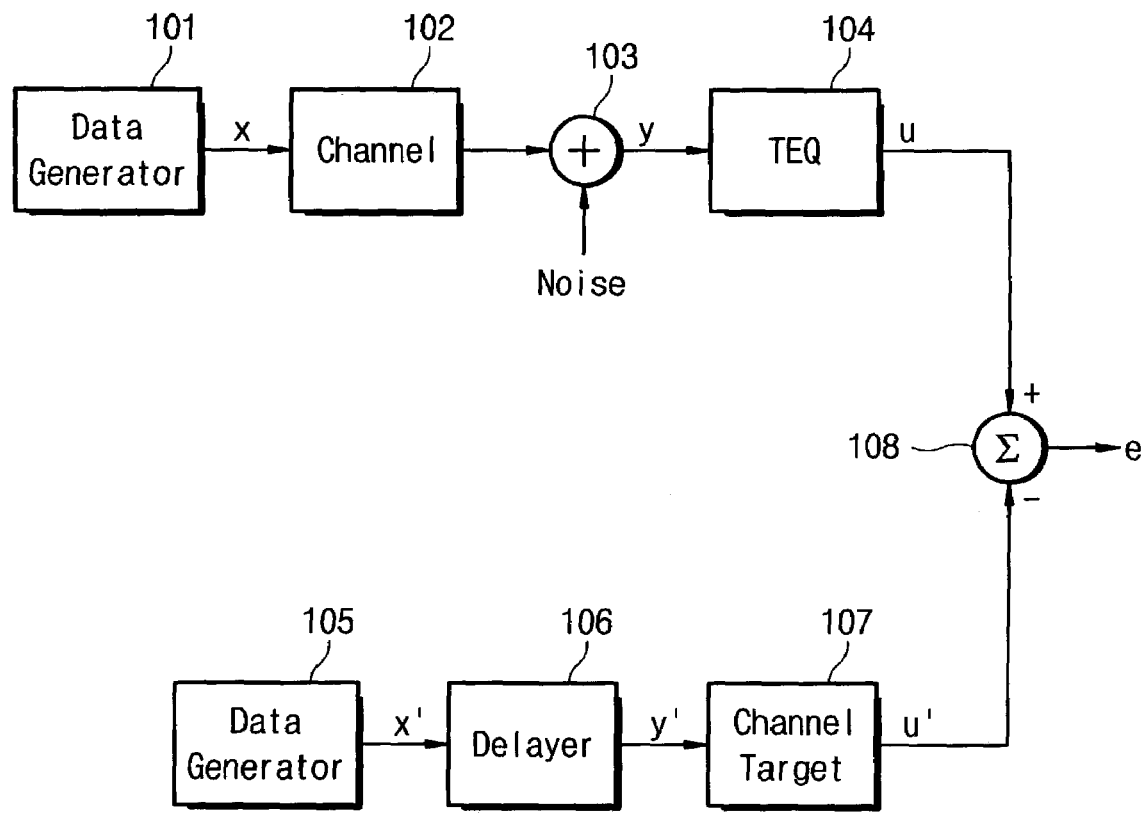
FIG. 3 is a view for explaining a method for determining coefficients of a time domain equalizer (TEQ) shown in FIG. 1.

Referring to FIG. 3, a data generator 101 on a transmission side, a channel 102, noise 103 superposed on the channel 102, a time domain equalizer (TEQ) 104, a data generator 105 on a reception side, a delayer 106 for compensating for delay in the channel 102, a channel target circuit 107 for a channel target characteristic, and a subtracter 108 are illustrated.

For training the TEQ 104, the data generator 101 on the transmission side generates a pseudo random signal x, and the data generator 105 on the reception side generates a pseudo random signal x'. The noise 103 is superposed on the pseudo random signal x through the channel 102. A pseudo random signal y superposed with the noise is input to the TEQ 104 that outputs a signal u.

The pseudo random signal x' from the data generator 105 is input to the channel target circuit 107 through the delayer 106. The channel target circuit 107 outputs a signal u'. The TEQ 104 adjusts tap coefficients such that an error E between the signals u and u' becomes zero. The channel target circuit 107 also adjusts the tap coefficients such that the error E therebetween becomes zero. The signals u and u' are combined by the subtractor 108.

Figure 4:
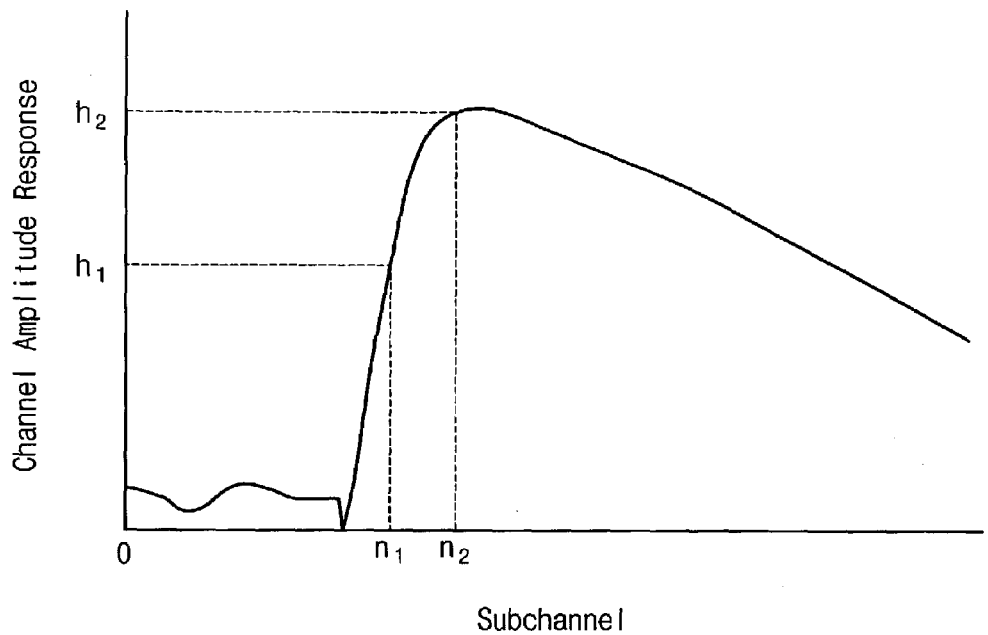
FIG. 4 is a graph showing the amplitude response of a conventional twisted-pair cable without a bridged tap in a discrete multitone (DMT) communication system.
Figure 5:
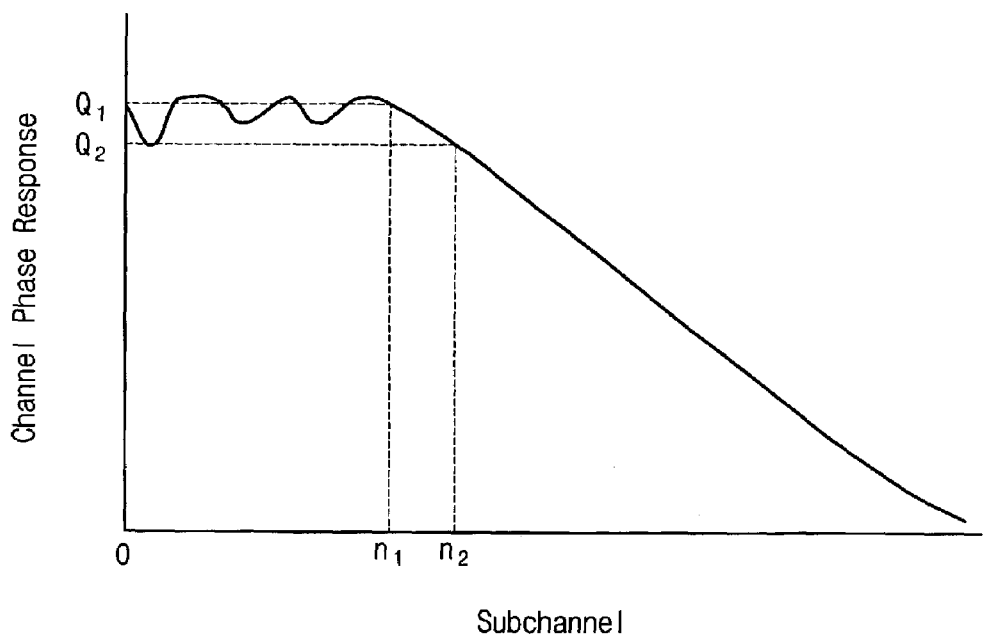
FIG. 5 is a graph showing the phase response of a twisted-pair cable.

A downstream amplitude response and a downstream phase response are shown in FIG. 4 and FIG. 5, respectively.

Referring to FIG. 4 and FIG. 5, in subchannels 0-n1, neither an amplitude response nor a phase response substantially exists, and only noise exists. This is because the subchannels 0-n1 are in upstream areas of an FDM communication system. Since no signal is received through an upstream area, a receiver cannot know of the frequency and phase characteristics for an upstream area of a channel. Although the receiver receives a signal through the upstream area so as to know the characteristic of the upstream area, signals of the upstream area are all attenuated by a digital filter or an analog filter of the receiver.

As previously described, there is the minimum MSE approach and the SVD algorithm approach to obtaining coefficients of the TEQ 22 using channel information shown in FIG. 4 and FIG. 5. Results obtained by these approaches are different from each other, but a frequency characteristic of a time domain equalizer is substantially identical as shown in FIG. 6.

Figure 6:
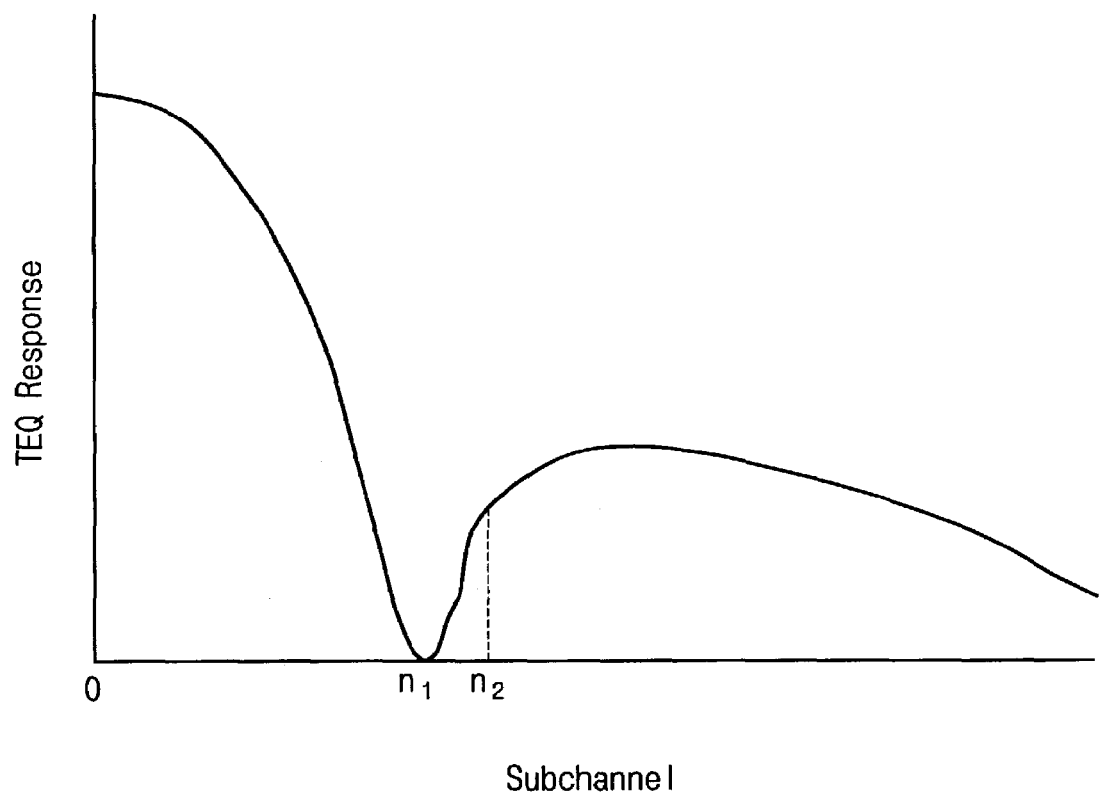
FIG. 6 is a graph showing the frequency response characteristic of a time domain equalizer (TEQ)

Referring to FIG. 6, a frequency response of the TEQ 22 is high in an upstream area where a signal is not received and is low in a downstream area where a signal is received. That is, a channel gain in the upstream area is amplified and a channel gain in the downstream area is attenuated. This is because the TEQ 22 is a finite impulse response (FIR) type filter. Thus, a gain of a low-response area is amplified and a gain of a high-response area is attenuated so that a general characteristic of a high-response area may be uniform.

Further, a channel response of the downstream area is abrupt and a channel response cannot be obtained for subchannels antecedent to a subchannel n1. Under this state, a time domain equalizer having 8–32 equalizers cannot divide a communication channel response into an upstream area response and a downstream area response. That is, correct channel equalization cannot be performed for subchannels n1 and n2 where the downstream area begins. To overcome the above disadvantages, a characteristic of the upstream area in a channel is estimated to determine coefficients of a time domain equalizer.

Figure 7:
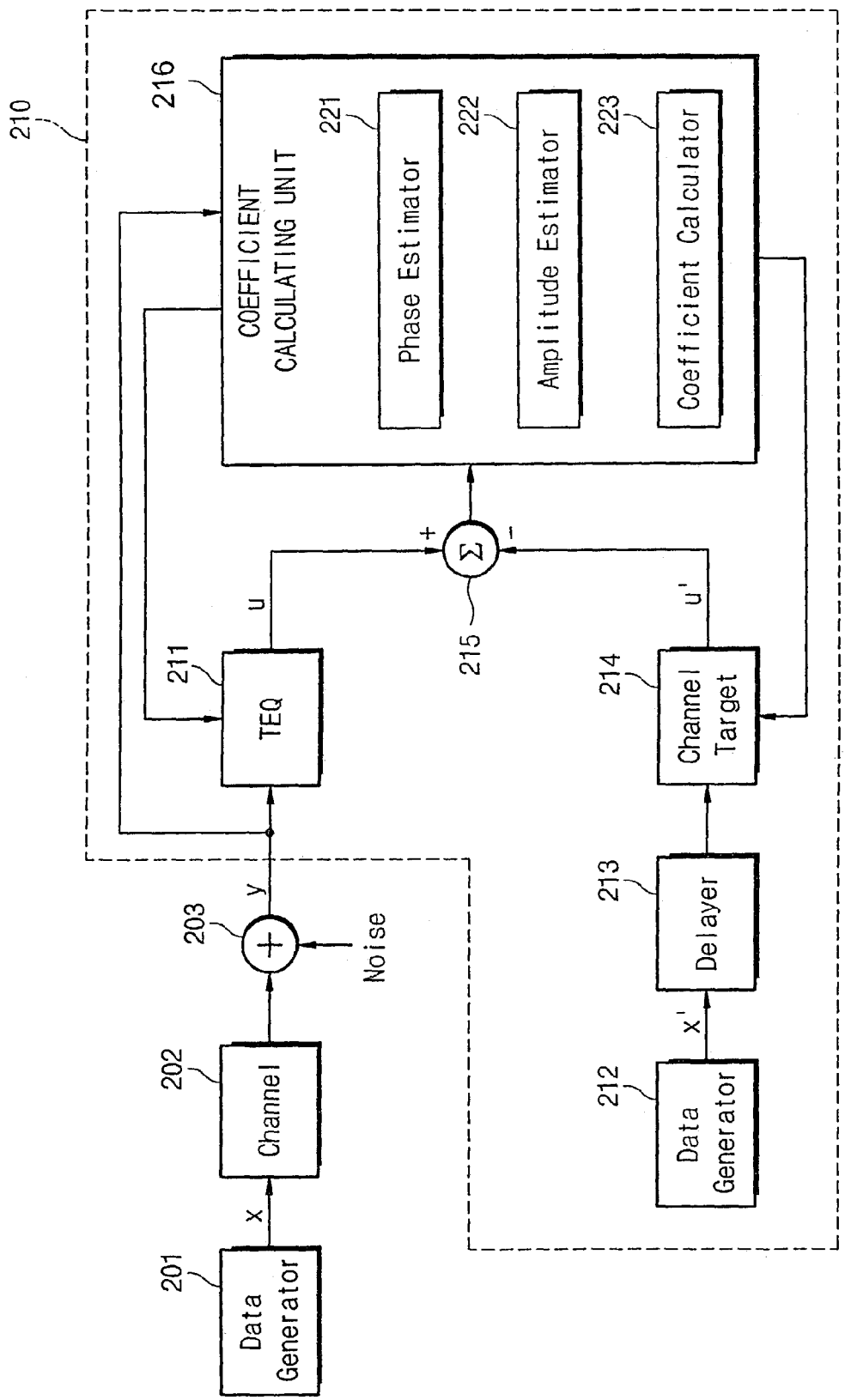
FIG. 7 is a block diagram of a digital data transmission apparatus comprising a coefficient determining unit according to an embodiment of the present invention.

A digital data transmission apparatus having a coefficient determining unit according to an embodiment of the present invention is schematically illustrated in FIG. 7.

Referring to FIG. 7, a data generator 201 on a transmission side, a channel 202, a noise superposed on the channel 202, and a digital data transmission apparatus 210 provided on a reception side are illustrated. The digital data transmission apparatus 210 comprises a time domain equalizer (TEQ) 211, a delayer 213, a channel target circuit 214 for a channel target characteristic, a subtracter 215, and a coefficient calculating unit 216.

During the signal processing in the TEQ 211, the data generator 201 in the transmission side generates a pseudo random signal X and the data generator 212 on the reception side generates the same signal X'. Noise 203 is superposed on the pseudo random signal X through the channel 202. A pseudo random signal Y, superposed with the noise 203, is input to the TEQ 211 that outputs a signal U.

The pseudo random signal X' from the data generator 212 is input to the channel target circuit 214 through the delayer 213. The channel target circuit 214 outputs a signal U'. The signals U and U' are combined by the subtracter 215 into a multi-dimensional signal and input to the coefficient calculating unit 216. The coefficient calculating unit 216 adjusts tap coefficients of the TEQ 211 and tap coefficients of the channel target circuit 214 such that an error between the signals U and U' becomes zero. The coefficient calculating unit 216 has a phase estimator 221, an amplitude estimator 222, and a coefficient calculator 223. The coefficient calculating unit 216 estimates a phase response and an amplitude response of an upstream area in a channel, and determines coefficients of the TEQ 211 and the channel target circuit 214.

A method for estimating a phase response of an upstream area in channels in the phase estimator 211 shown in FIG. 7 is explained with reference to a graph of FIG. 8.

Figure 8:
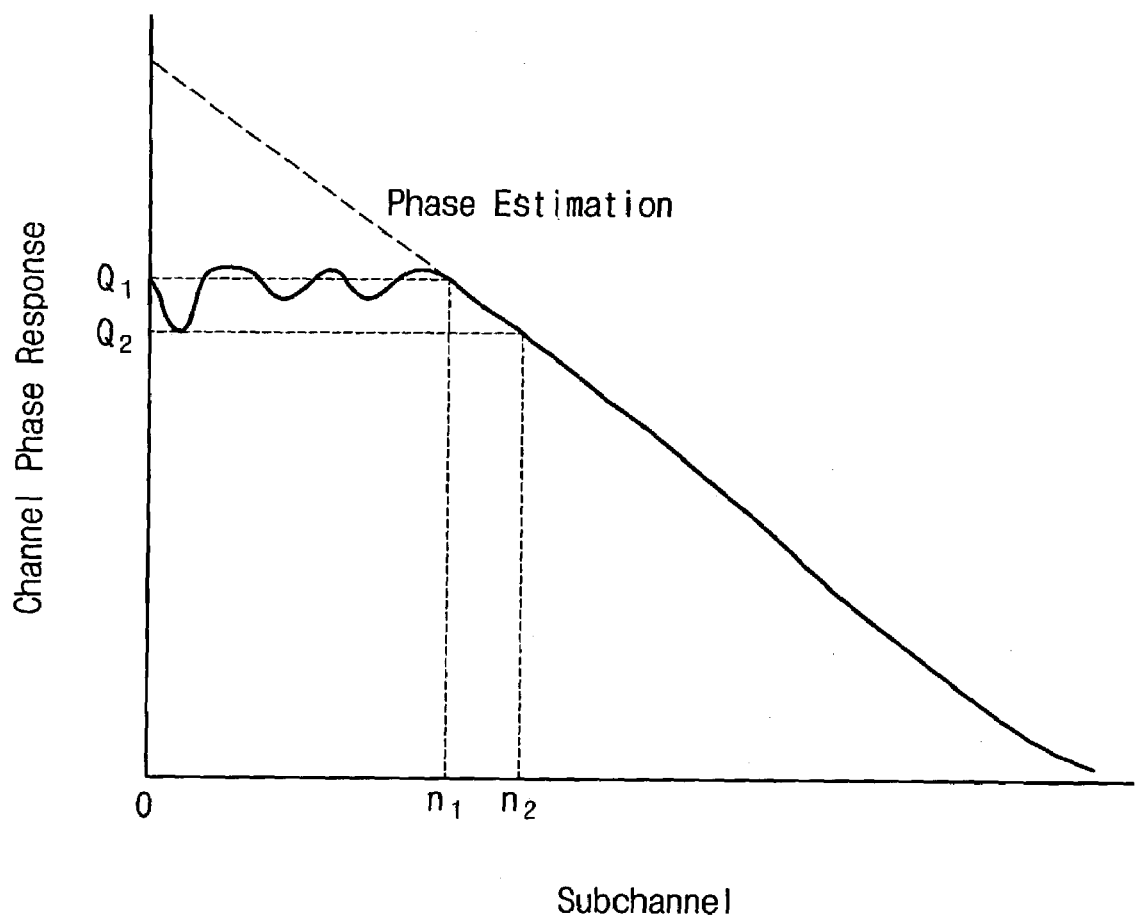
FIG. 8 is a graph for explaining a method of estimating the phase response of an upstream area in a channel of a phase estimator shown in FIG. 7.

Referring to FIG. 8, phases of an upstream area in channels, i.e., a subchannel 0 to a subchannel antecedent to a subchannel n1 are estimated by an extrapolation method. That is, assuming a phase characteristic of a given channel has a linearity, the phase characteristic thereof is expressed as a linear function to obtain phases of subchannels in the upstream area. In this case, a gradient of the linear function used in the extrapolation is determined by phases of the subchannels n1 and n2. Sub Subchannel n1 and n2 are subchannels in a downstream area, and a frequency of subchannel n2 is higher than that of subchannel n1.

If a phase response of subchannel n1 is φ1 and a phase response of subchannel n2 is φ2, a gradient of a linear function to be used for the phase extrapolation is $$\frac{\varphi 2 - \varphi 1}{n2 - n1}.$$

Thus, the phase extrapolation is given by the following:

$$\varphi_i' = \frac{\varphi 2 - \varphi 1}{n2 - n1} i + \frac{\varphi 1 n2 - \varphi 2 n1}{n2 - n1}, i = 0, 1, \ldots, n1 \quad \text{[Equation 1]}$$

In the case of n2=n1+1, the above equation 1 is simplified as follows:

$$\varphi_i' = (\varphi 2 - \varphi 1)i + \varphi 1 + (\varphi 2 - \varphi 1)n1, i=0, 1, \ldots, n1 \quad \text{[Equation 2]}$$

Figure 9:
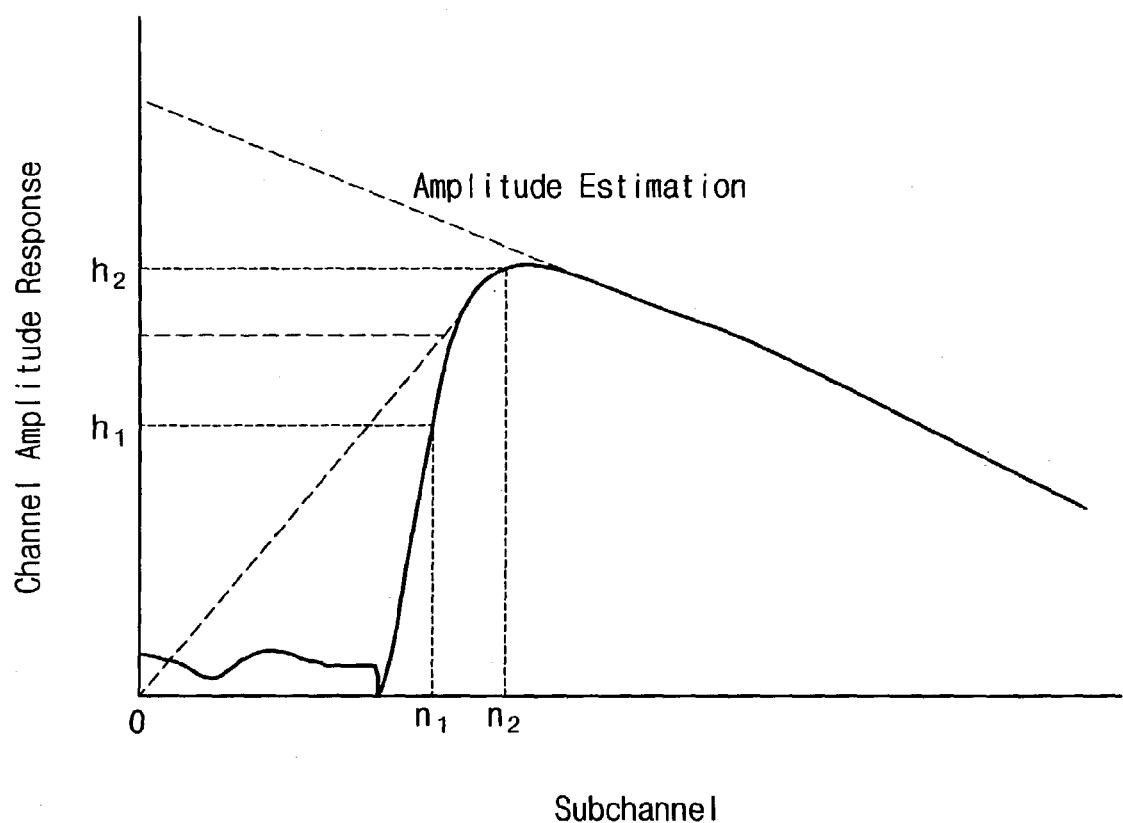
FIG. 9 is a graph for explaining a method of estimating the amplitude response of an upstream area in a channel of a phase estimator shown in FIG. 7.

A graph of FIG. 9 shows one method for estimating an amplitude response of an upstream area in a channel in the amplitude estimator shown in FIG. 7.

Referring to FIG. 9, an amplitude gradient used for the extrapolation can have a variety of estimated values. That is, the gradient can have a positive value, be zero, or have a negative value. If an amplitude response of the subchannel n1 is h1 and an amplitude response of the subchannel n2 is h2, an amplitude response by a linear extrapolation from the subchannel 0 to the subchannel n1 is given by the following:

$$h_i' = \frac{h2 - h1}{n2 - n1} i + \frac{h1n2 - h2n1}{n2 - n1}, i = 0, 1, \ldots, n1 \quad \text{[Equation 3]}$$

$$h_i' = h1, i=0, 1, \ldots, n1 \quad \text{[Equation 4]}$$

$$h_i' = \frac{h1 - h2}{n2 - n1} i + \frac{h1n2 - h2n1 - 2h1n1}{n2 - n1}, i = 0, 1, \ldots, n1 \quad \text{[Equation 5]}$$

For example, to perform the amplitude extrapolation using the same gradient as an amplitude response of a downstream area of the channel, the upstream amplitude of the channel is estimated from the gradient of the equation 3. On the other hand, to perform the amplitude extrapolation using a gradient in the reverse direction of the amplitude response of the downstream area in the channel, the upstream gradient of the channel is estimated from the gradient of the equation 5. Further, to perform the amplitude extrapolation irrespective of the amplitude response of the downstream area in the channel, the amplitude of the downstream area in the channel is set to any value.

According to the above-described method, the phase and amplitude characteristics of the upstream area in the channel are estimated to reduce the inter-symbol interference (ISI). However a channel gain is still distributed to the upstream area, therefore, the potential improvement in a signal to noise ratio (SNR) is limited. According to an embodiment of the present invention, a proposed solution to the aforementioned limitation is to apply virtual noise to the upstream area when the amplitude response of the upstream area is extrapolated. Therefore, it is possible to prevent a time domain equalizer from distributing a channel gain to the upstream area.

Figure 10:
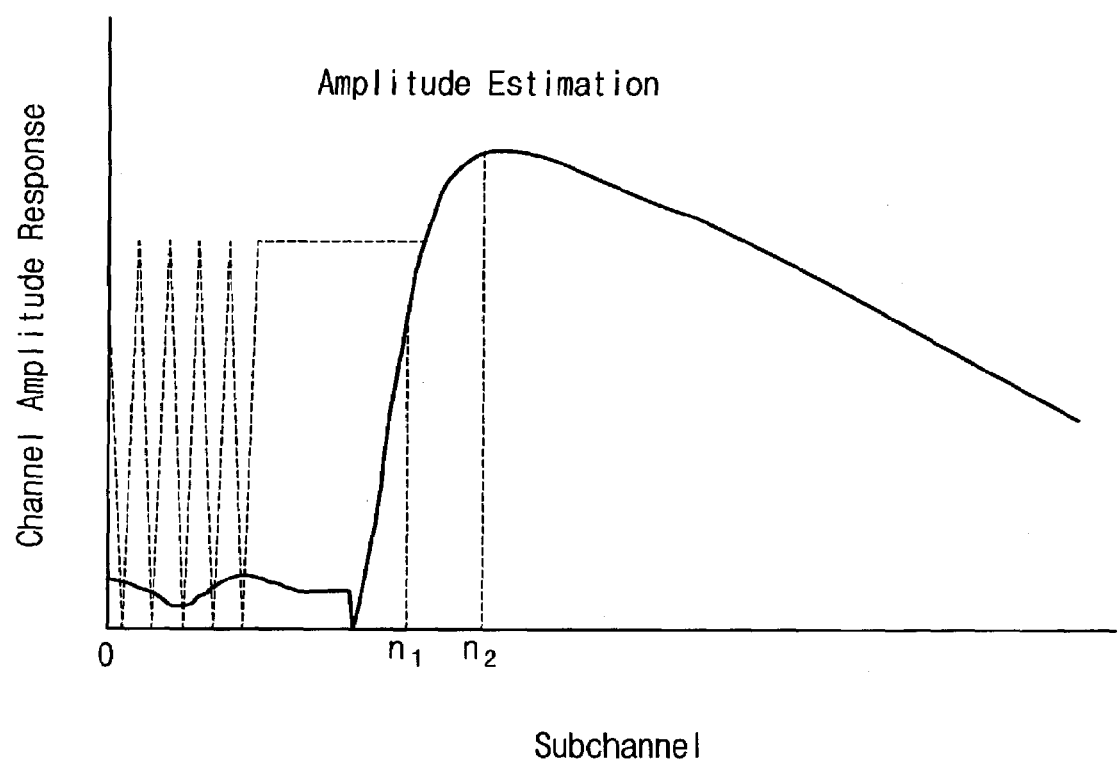
FIG. 10 is a graph for explaining a method of estimating the amplitude response of an upstream area of a channel with the use of an amplitude estimator shown in FIG. 7.

A graph of FIG. 10 shows a method for estimating an amplitude response of an upstream area in a channel in the amplitude estimator 222 shown in FIG. 7 according to an embodiment of the present invention.

Referring to FIG. 10, an amplitude response is extrapolated so that partial amplitude responses from a subchannel 0 to a subchannel n1 can be h1 and amplitude responses of the other subchannels can be h1/256. Equations 6 and 7 exemplarily show that an amplitude response is extrapolated so that amplitude responses of even-number subchannels can be h1 and amplitude responses of odd-number subchannels can be h1/256.

$$h_i' = h1, i = 0, 2, 4, \ldots, n1' \qquad \text{[Equation 6]}$$

$$h_i' = \frac{h1}{256}, i = 1, 3, 5, \ldots, n1 \qquad \text{[Equation 7]}$$

Figure 11:
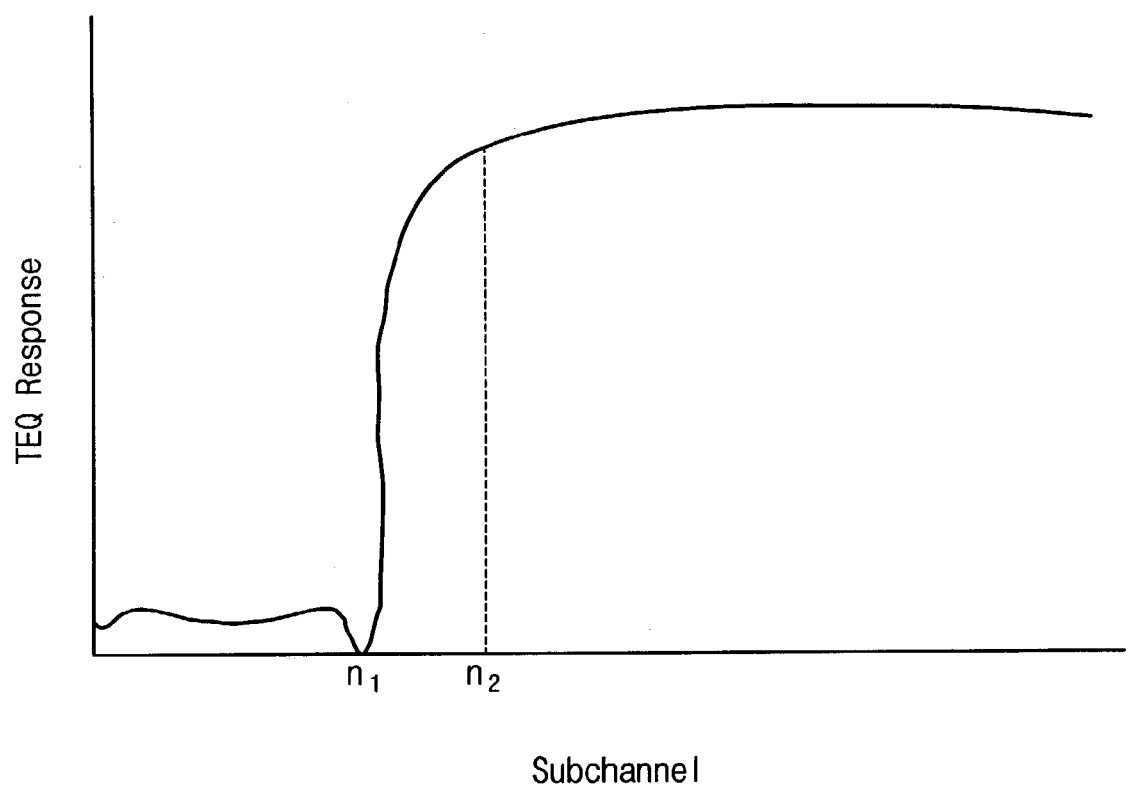
FIG. 11 is a graph showing the response characteristic of a time domain equalizer (TEQ) according to an embodiment of the present invention.

FIG. 11 shows a response characteristic of a time domain equalizer when the amplitude response of the upstream area in the channel is distorted by strong noise.

Referring to FIG. 11, a gain from a subchannel 0 to a subchannel n1 (i.e., an upstream area) is small, and a gain of subchannels precedent to the subchannel n1 is relatively large. Therefore, the general performance of an FDM communication system is enhanced.

A frequency characteristic of an upstream area is estimated in the phase estimator 221 and the amplitude estimator 222, the coefficient calculator 223 shown in FIG. 7 determines coefficients of the time domain equalizer (TEQ) 211.

If a reference symbol x denotes a pseudo random signal output from the data generator 201, a reference symbol y denotes a pseudo random signal input to the TEQ 211, reference symbols a1, a2, . . . , and ak denote coefficients of the TEQ 211, and reference symbols b1, b2, . . . , and bk denote coefficients of the channel target circuit 214, they have a relationship given by equation 8.

$$y(n)+a1y(n-1)+a2y(n-2)+ \ldots +aky(n-K)=b0x(n-\delta)+b1x(n-\delta-1)+ \ldots +bMx(n-\delta-M) \qquad \text{[Equation 8]}$$

The coefficients a1, a2, . . . , and ak of the TEQ 211 are defined as shown in equation 9, and the coefficients b1, b2, . . . , and bk of the channel target circuit 214 are defined as shown in equation 10.

$$a = \begin{bmatrix} a1 \\ a2 \\ \ldots \\ aK \end{bmatrix} \qquad \text{[Equation 9]}$$

$$b = \begin{bmatrix} b0 \\ b1 \\ \ldots \\ bM \end{bmatrix} \qquad \text{[Equation 10]}$$

If an impulse response of the channel 202 is h(z), the coefficients a1, a2, . . . , and ak, the coefficients b1, b2, . . . , and bk, and the h(z) have a relationship given by equation 11.

$$h(z) = z^{-\delta}b(z)/1+a(z) \qquad \text{[Equation 11]}$$

where the number of the coefficients of the TEQ 211 is K+1 and the number of coefficients of the channel target circuit 214 is M+1=CP+1 (CP being the length of a cyclic prefix).

The coefficients of the TEQ 211 are determined using the Minimum MSE algorithm. The Minimum MSE algorithm obtains the coefficients of the TEQ 211 and the coefficients of the channel target circuit 214, which are used to minimize an error between an output signal u from the TEQ 211 and an output signal u' from the channel target circuit 214. A cost function of the Minimum MSE algorithm is given by equation 12.

$$J = E\{e^2\} \qquad \text{[Equation 12]}$$

While the Minimum MSE algorithm achieves desirable results in many cases, e.g., desirable coefficients of the TEQ 211 and desirable coefficients of the channel target circuit 214, the coefficients of the TEQ 211 may diverge, or comprise noise 203 or distortion that decreases the stability of a general system. Therefore, according to an embodiment of the present invention, a square term of the coefficient of the TEQ 211 is added to a cost function.

$$J = E\{e^2\} + \lambda |a|^2, \lambda \neq 1 \qquad \text{[Equation 13]}$$

According to the equation 13, the cost function is obtained to minimize the MSE and restrict the sizes of the coefficients of the TEQ 211. If the definition of 220

$$\bar{y} = \begin{bmatrix} y(n-1) \\ y(n-2) \\ \ldots \\ y(n-K) \end{bmatrix} \text{ and } \bar{x} = \begin{bmatrix} x(n-\delta) \\ x(n-\delta-1) \\ \ldots \\ x(n-\delta-M) \end{bmatrix},$$

y(n) is given by the following equation 14;

$$y(n) = -a^T\bar{y} + b^T\bar{x} \qquad \text{[Equation 14]}$$

an error between the output u of the TEQ 211 and the output u' of the cannel target circuit 214 is expressed by equation 15.

$$e(n) = y(n) + a^T\bar{y} - b^T\bar{x} \qquad \text{[Equation 15]}$$

Using the equation 15, the cost function of the equation 13 is rearranged as shown in equation 16.

$$J = E\{y^2(n) + 2a^T\bar{y}y(n) - 2b^T\bar{x}y(n) - 2b^T\bar{x}\,\bar{y}a^T + a^T\bar{y}\,\bar{y}^Ta + b^T\bar{x}\,\bar{x}^Tb\} + \lambda |a|^2 \qquad \text{[Equation 16]}$$

In the cost function J of the equation 16, there are minimum values for coefficients a of the TEQ 211 and minimum values for coefficients b of the channel target circuit 214. A minimum value of the cost function J is achieved where a gradient of J to a is zero and a gradient of J to b is zero, as shown in equations 17 and 18.

$$\frac{\partial J}{\partial a} = 0 \qquad \text{[Equation 17]}$$

$$\frac{\partial J}{\partial a} = 0 \qquad \text{[Equation 18]}$$

If the definition is $R_{yy} = E\{\bar{y}\,\bar{y}^T\}$, $R_{xx} = E\{\bar{x}\,\bar{x}^T\}$, $R_{yx} = E\{\bar{y}\,\bar{x}^T\}$, $R_{xy} = E\{\bar{x}\,\bar{y}\}$, $P_y = E\{\bar{y}\,y(n)\}$, and $r_{yy} = E\{y(n)y(n-k)\}$, the cost function J is to be arranged in equation 19.

$$J = r_{yy}(0) + 2a^TP_y - 2b^TP_x - 2b^TR_{xy}a^T + a^TR_{yy}a + b^TR_{xx}b + \lambda |a|^2 \qquad \text{[Equation 19]}$$

Since the pseudo random signal x generated from the data generator 201 is an impulse signal, the result is $R_{xx}=I$ and $R_{xy}=R_{yx}^T$.

A J-a gradient and a J-b gradient are given by equations 20 and 21, respectively.

$$\frac{\partial J}{\partial a} = 2P_y - 2R_{xy}^T + 2R_{yy}a + 2\lambda a = 0 \quad \text{[Equation 20]}$$

$$\frac{\partial J}{\partial b} = -2P_x - 2R_{xy}a + 2b = 0 \quad \text{[Equation 21]}$$

Equation 20 can be arranged for a and equation 21 can be arranged for b as shown in equations 22 and 23, respectively.

$$a = (R_{yy} - \lambda I - R_{xy}^T R_{xy})^{-1}(R_{xy}^T P_x - P_y) \quad \text{[Equation 22]}$$

$$b = P_x + P_{xy}a \quad \text{[Equation 23]}$$

The coefficients a and b, which are the determined results of the coefficient calculator 223 shown in FIG. 7, are output to the TEQ 211 and the channel target circuit 214, respectively.

As described above, a phase response for an upstream area in a channel is estimated by means of an extrapolation. Following forcible distortion of an amplitude response, coefficients of a time domain equalizer and coefficients of a channel target circuit are determined using the Minimum MSE algorithm. When a cost function J of the Minimum MSE is determined, the square of the coefficients of the time domain equalizer is included for determining the cost function J. Therefore, a channel-shortening effect of the time domain equalizer is improved to reduce inter-symbol interference (ISI) and inter-channel interference (ICI). As a result, a signal to noise ratio (SNR) of a communication system is improved.

Figure 12:
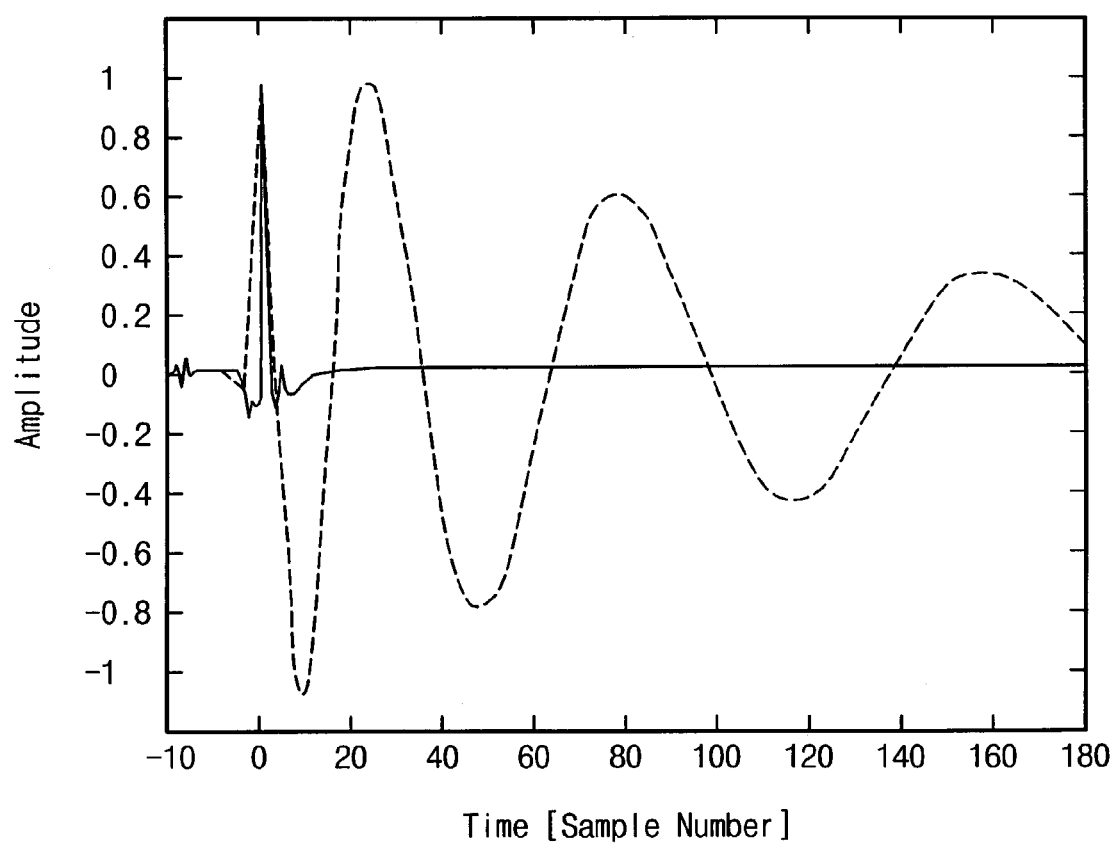
FIG. 12 is a graph showing the characteristic of an equalizer when coefficients of the equalizer are set based on the coefficient determining method according to an embodiment of the present invention.

A graph of FIG. 12 shows the characteristic of an equalizer when coefficients of the equalizer are set by the coefficient determining method according to an embodiment of the present invention, in which a transversal axis denotes time and a longitudinal axis denotes amplitude. A channel impulse response, (demarcated by a dotted line) transmitted from a transmission side has an influence on adjacent symbols. Meanwhile, a channel impulse response (demarcated by a solid line) equalized by an equalizer of this invention is shortened to a narrow amplitude. Accordingly, since the equalized channel impulse response becomes substantially similar to an original pulse signal transmitted from the transmission side, it does not overlap adjacent symbols.

Although particular embodiments of the present invention have been shown and described, it will be apparent to those skilled in the art that changes and modifications can be made without departing from the present invention in its broader aspects. Therefore, the invention is limited only by the following claims.

What is claimed is:

1. A method for determining coefficients of a time domain equalizer in a receiver for receiving a signal transmitted through a downstream area in a communication channel having an upstream area and the downstream area, the method comprising:
   estimating a frequency response of the upstream area in the communication channel; and
   determining the coefficients of the time domain equalizer from an estimated frequency response of the upstream area and a frequency response of the downstream area, wherein determining the coefficients of the time domain equalizer comprises:
   determining a cost function using the estimated frequency response of the upstream area and the frequency response of the downstream area; and
   determining the coefficients using a determined cost function,
   and wherein the cost function is a sum of a square of a difference between a channel impulse response of the communication channel and an equalized channel impulse response and a square of the coefficient of the time domain equalizer.

2. The method as recited in claim 1, wherein the channel impulse response of the communication channel and the equalized channel impulse response are determined according to a pseudo random spinal transmitted to the receiver through the communication channel.

3. The method as recited in claim 1, wherein the frequency response of the upstream area comprises a phase response and an amplitude response of the upstream area.

4. The method as recited in claim 3, wherein the phase response of the upstream area is estimated based on gradients of subchannels in the downstream area.

5. The method as recited in claim 3, wherein the amplitude response of the upstream area is estimated wherein amplitudes of adjacent subchannels in the upstream area have different values.

6. The method as recited in claim 5, wherein the amplitude response of the upstream area is estimated wherein even-number subchannels in the upstream area have a predetermined value h1 and odd-number subchannels have a value h2 that is smaller than the predetermined value h1.

7. An apparatus for determining coefficients of a time domain equalizer in a receiver for receiving a signal transmitted through a downstream area in a communication channel having an upstream area and the downstream area, the apparatus comprising:
   a data generator for generating a pseudo random signal in the upstream area; an estimator for estimating a frequency response of the pseudo random signal in the upstream area, the estimator comprising a phase estimator for estimating a phase response of the upstream area, and an amplitude estimator for estimating an amplitude response of the upstream area, wherein the amplitude estimator estimates amplitudes of adjacent subchannels in the upstream area; and
   a calculator for determining the coefficients of the time domain equalizer from an estimated frequency response of the upstream area and a frequency of the downstream area.

8. The apparatus as recited in claim 7, wherein the phase estimator estimates the phase response of the upstream area based on gradients of subchannels in the downstream area.

9. The apparatus as recited in claim 7, wherein the calculator determines a cost function using the estimated frequency response of the upstream area and the frequency response of the downstream area, and determines the coefficients of the time domain equalizer using a determined cost function.

10. The apparatus as recited in claim 9, wherein the cost function is a sum of a square of a difference between a channel impulse response of the communication channel and an equalized channel impulse response and a square of the coefficient of the time domain equalizer.

11. The apparatus as recited in claim 10, wherein the channel impulse response and the equalized channel impulse response are determined according to a pseudo random signal transmitted to the receive through the communication channel.

12. A method for setting coefficients of a time don am equalizer in a communication system for transmitting a signal through a communication channel having an upstream area and a downstream area so that an error between an output of the time domain equalizer and an output of a channel target circuit becomes zero, the method comprising:

estimating a frequency response of the upstream area in the communication channel;

estimating an output of the time domain equalizer from an estimated frequency response of the upstream area and a frequency response of the downstream area;

determining a cost function J from an estimated output of the time domain equalizer and the output of the channel target circuit, wherein the cost function J is given by the following equation:

$$J=E\{e^2\}+\lambda |a|^2$$

where E is an error function, e is an error between an output of the time domain equalizer and the output of the channel target circuit, $\lambda$ is an integer except 1, and a is coefficients of the time domain equalizer; and determining coefficients where the cost function J has a minimum value.

13. The apparatus as recited in claim 12, wherein the coefficients of the time domain equalizer are determined from the cost function J by means of a minimum mean square error (MSE) algorithm.

* * * * *